(12) United States Patent
Powell et al.

(10) Patent No.: US 8,074,438 B2
(45) Date of Patent: Dec. 13, 2011

(54) LINK CHAIN

(75) Inventors: Gordon Powell, Malvern (GB); Craig Bowkett, St Johns (GB)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 12/581,856

(22) Filed: Oct. 19, 2009

(65) Prior Publication Data

US 2011/0088367 A1    Apr. 21, 2011

(51) Int. Cl.
*F16G 13/02* (2006.01)
*F16G 13/18* (2006.01)

(52) U.S. Cl. .............. 59/78; 59/31; 59/35.1; 59/84

(58) Field of Classification Search .......... 59/31, 35.1, 59/78, 84, 93
See application file for complete search history.

(56) References Cited

U.S. PATENT DOCUMENTS

| | | | |
|---|---|---|---|
| 1,806,733 A * | 5/1931 | Bell et al. | 59/84 |
| 2,732,178 A * | 1/1956 | Chaney | 59/78 |
| 3,453,823 A * | 7/1969 | Mundt | 59/90 |
| 3,664,121 A * | 5/1972 | Camitz | 59/84 |
| 4,216,070 A * | 8/1980 | Debost | 59/84 |
| 4,627,232 A * | 12/1986 | Bruce | 59/84 |
| 5,778,655 A * | 7/1998 | Lange | 59/31 |

FOREIGN PATENT DOCUMENTS

DE    629455 C    4/1936

OTHER PUBLICATIONS

Search Report under Section 17 from UK Intellectual Property Office, Application No. GB1017604.8, dated Feb. 11, 2011.

* cited by examiner

*Primary Examiner* — David Jones
(74) *Attorney, Agent, or Firm* — Michael Best & Friedrich LLP

(57) ABSTRACT

A link chain comprises a chain link including two shank portions and two arc portions connecting the two shank portions. The two shank portions and the two arc portions define an interior space of the first chain link; and a dividing element extends inwardly from an inside surface of one of the two shank portions and extends inwardly from the inside surface of the other shank portion. The dividing element divides the interior space into two movement spaces, and the dividing element has a centerline, and the centerline is not a straight line perpendicular to the shank.

25 Claims, 3 Drawing Sheets

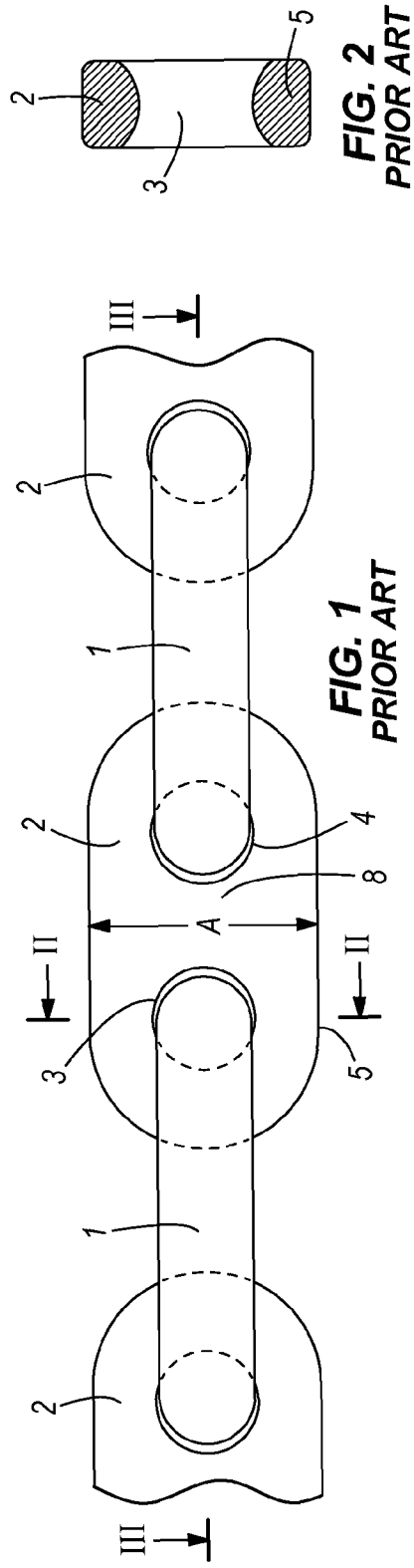
FIG. 1
*PRIOR ART*
FIG. 2
*PRIOR ART*
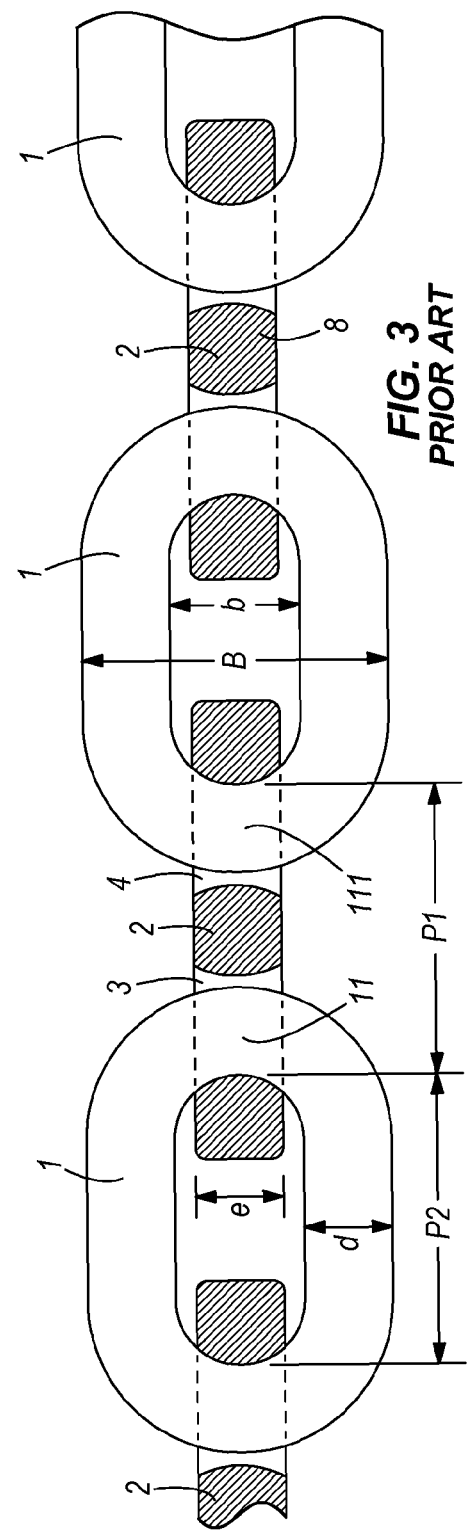
FIG. 3
*PRIOR ART*

LINK CHAIN

BACKGROUND

This disclosure relates to conveyor elements for the transport of bulk materials such as coal and the like, and, more particularly, to chain used in connection with longwall conveyor systems.

More particularly, this disclosure relates to a link chain formed of a sequence of individual, consecutive chain links linked with one another. The link chain has an arrangement that prevents or minimizes misalignment of the link chain.

A longwall conveyor system includes a pan and a coal conveying chain and flight mechanism thereon. The coal conveying mechanism includes a sprocket drive that pulls the chain and flight mechanism along the pan. The flights are attached to the chain at spaced intervals. As the chain and flights move along the pan, coal is carried by the flights to the end of the pan, where it is transferred to a mechanism for taking the coal out of the underground mine.

Link chains consist of a plurality of individual chain links linked with one another. In the case of link chains for industrial applications, such as, for example, a conveyor chain for use in underground coal mining, the individual chain links are subjected to extremely high tensile stress.

A link chain demonstrates its maximum ability to withstand tensile stress when the individual chain links are disposed one after the other in an intended manner such that the inside portions of two facing arcs of two consecutive chain links rest against one another. The rated ability of a link chain to withstand stress regularly presupposes that the chain links of the link chain that is subject to the tensile stress are disposed, relative to one another, in the intended manner described above.

Mining chain comprises welded wire links or welded wire links lased to forged links, where the individual links are oval in shape. Some chains incorporate a link with a cross member or dividing element that forms a "figure of 8" link to limit the amount of moment that can occur between the individual links, thereby preventing the chain from knuckling. This geometry is extensively used on anchor chains, where knuckling would prevent the chain being safely stowed onboard ship. However, the figure of 8 link is very stiff as the cross member prevents the crown and sides of the link breathing and flexing together. Highly loaded mining chain requires a level of flexibility to enable it to with stand shock loading typical seen on scrapper conveyors.

An example of such a chain can be found in GB 693734A, from which prior art FIGS. 1 to 3 are reproduced herein. In this chain, the chain shown is formed by links 1 of a normal round-wire type and links 2 of a novel type having plane edges. The links 1 and 2 succeed one another in the chain alternately and they engage one another therein in the manner illustrated. The links 1 are, for example, calibrated links of marine chains, their internal length or pitch being P2, their width B, and the diameter of the wire of which they are composed d. The links 2 each consist of a plate of flattened oval form, that is, each consists of an oval plate the rounded ends of which are connected by plane or nearly plane surfaces. The said plate, which is fashioned by cutting or forging, for example, has a width A that is smaller than the width B of links 1, and is formed with two holes 3 and 4 limited by toroidal surfaces, with a dividing element 8 there between. The said holes are so dimensioned and positioned as to receive, respectively, the neighboring ends 11 and 111 of the adjacent links 1 and to permit the articulation of these links in all directions with respect to the link 2. To this end, the holes 3 and 4 are made with a diameter slightly larger than d, and the toroidal surfaces limiting these holes are adapted to make them fit, at least approximately, along the inner surface of the ends 11 and 111. The spacing between the holes 3 and 4 is preferably so chosen that the distance P1 separating the extreme edges of the holes is equal to the internal length P2 of the links 1. The thickness e of the links 2 is smaller than the internal width b of the links 1 and is sufficient to enable the link 2 to resist the pull exerted thereon in use. For example e may be equal to d.

SUMMARY

It is an object of this disclosure to take as its starting point a typical Longwall conveyor chain and introduce a curved or angled shape to a cross leg that is positioned central to the chain link. By adding a curved shape to the cross beam the cross beam's stiffness is significantly reduced and hence its rigidity. This simple modification to the normal straight cross beam typically used in figure of eight chain links results in a chain link that can breath and stretch; thus maintaining it ability to absorb shock loading, whilst limiting the amount of movement between links, thereby preventing chain knuckling. A further enhancement to this chain link geometry and one that provides further flexibility to the link under load is to taper the straight leg sections from the full crown cross-sectional area down to a smaller one at the junction of these legs to a "S" cross beam.

In other words, in this disclosure a link chain comprises a chain link including two shank portions and two arc portions connecting the two shank portions. The two shank portions and the two arc portions define an interior space of the first chain link; and a dividing element extends inwardly from an inside surface of one of the two shank portions and extends inwardly from the inside surface of the other shank portion. The dividing element divides the interior space into two movement spaces, and the dividing element has a centerline, and the centerline is not a straight line perpendicular to the shank.

BRIEF DESCRIPTION OF THE DRAWINGS

FIG. 1 is an elevational view of a portion of a prior art chain.

FIG. 2 is a section on the line II-II of FIG. 1 through one of the links of the chain having a plane edge.

FIG. 3 is a section through the chain on the line III-III of FIG. 1.

Figure 4:
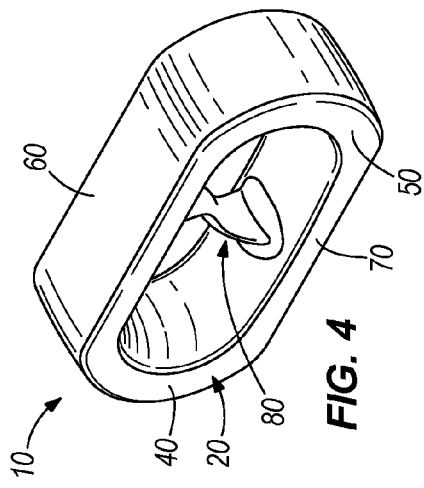
FIG. 4 is a perspective view of a new chain link according to this disclosure.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DESCRIPTION OF THE PREFERRED EMBODIMENT

The preferred embodiment is a modification of the chain of FIGS. 1, 2 and 3, with changes made to the link 2. More particularly, in a link 20 shown in FIGS. 4-7, the cross leg or dividing section 8 has been modified as described below. In all other respects, the structure of the chain in FIGS. 1, 2 and 3 is the same.

More particularly, the chain 10 including the chain link 20 comprises shanks 60, 70 that connect arcs 40, 50 with one another. The inside length of the chain link 20 is divided into two movement spaces, separate from one another, by means of the dividing element 80 that projects away from shanks 60, 70 that connect arcs 40, 50 with one another.

The horizontal chain link 1 follows the vertical chain link 20 and is linked into a movement space of the chain link 20. The chain link 1 has a single movement space into which the chain link 20 engages with its arc 50, and into which another chain link, shown as vertical chain link 20, following the second chain link 1, engages. The mobility of the chain link 1 with reference to the chain link 20 is therefore limited by an arc of the subsequent chain link 20, which also engages into the movement space of the chain link 1.

In other words, the chain 10 comprises a plurality of individual chain links 1 and 20 arranged in a repeating sequence, the sequence comprising: a first chain link 20 comprising two shank portions 60 and 70; two arc portions 40 and 50 connecting the two shank portions 60 and 70, wherein the two shank portions and the two arc portions define an interior space 90 of the first chain link 20. The dividing element 80 extends inwardly from an inside surface of one of the two shank portions and extends inwardly from the inside surface of the other shank portion. The dividing element 80 divides the interior space into two movement spaces, and the dividing element 80 has a centerline 94, and the centerline 94 is not a straight line perpendicular to either shank portion 60 or 70.

Figure 6:
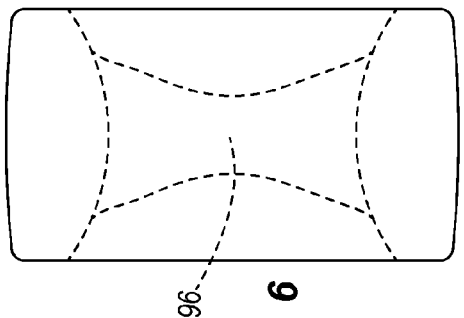
FIG. 6 is an end view of the chain link of FIG. 4.
Figure 7:
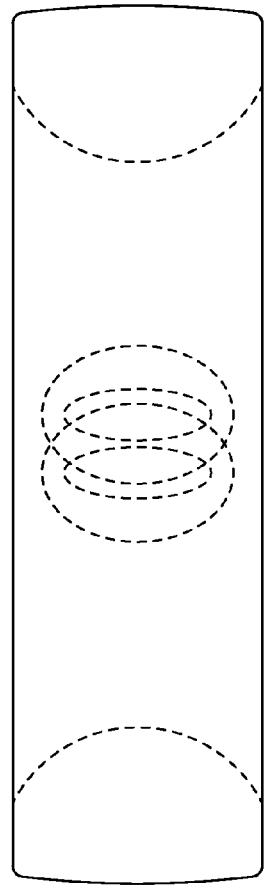
FIG. 7 is a top view of the chain link of FIG. 4.
Figure 5:
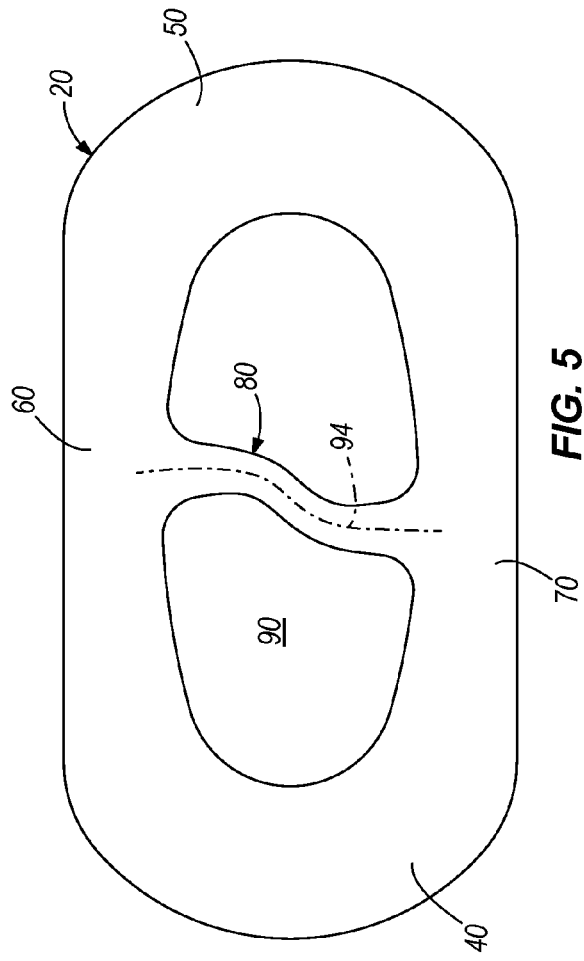
FIG. 5 is a side view of the chain link of FIG. 4.

More particularly, in the preferred embodiment, the dividing element 80 extends along a curved centerline 94 from one shank 60 to the other shank 70. Still more particularly, the curved centerline 94 forms an S shape. Further, the dividing element point of attachment to each shank has a larger cross sectional than the cross sectional area of the midpoint 96 of the dividing element 80, as best shown in FIGS. 4 and 6.

Figure 9:
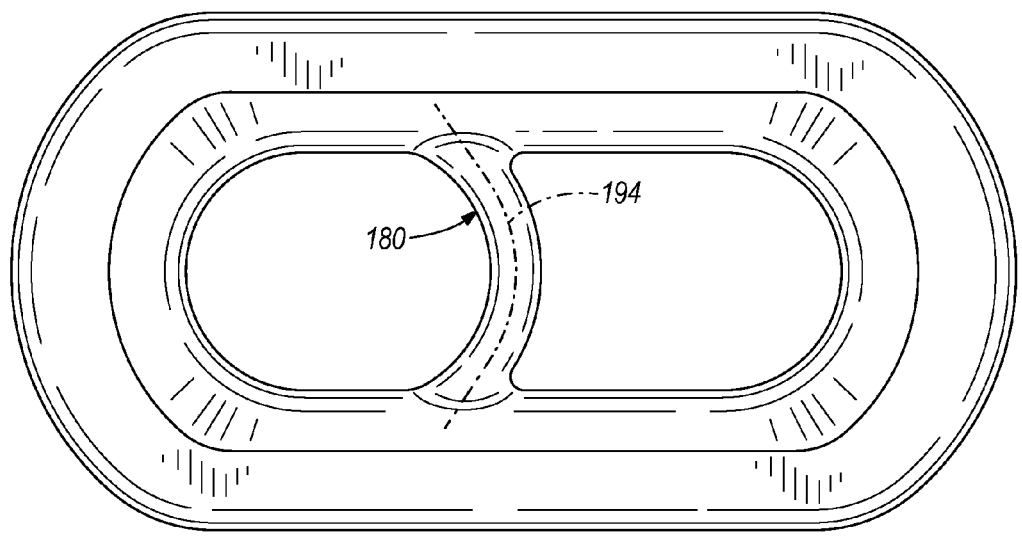
FIG. 9 is a side view of another alternate embodiment of the chain link according to this disclosure.

In other less preferred embodiments, as illustrated in FIG. 9, the dividing element 180 has a curved centerline 194 that forms a C shape.

Figure 8:
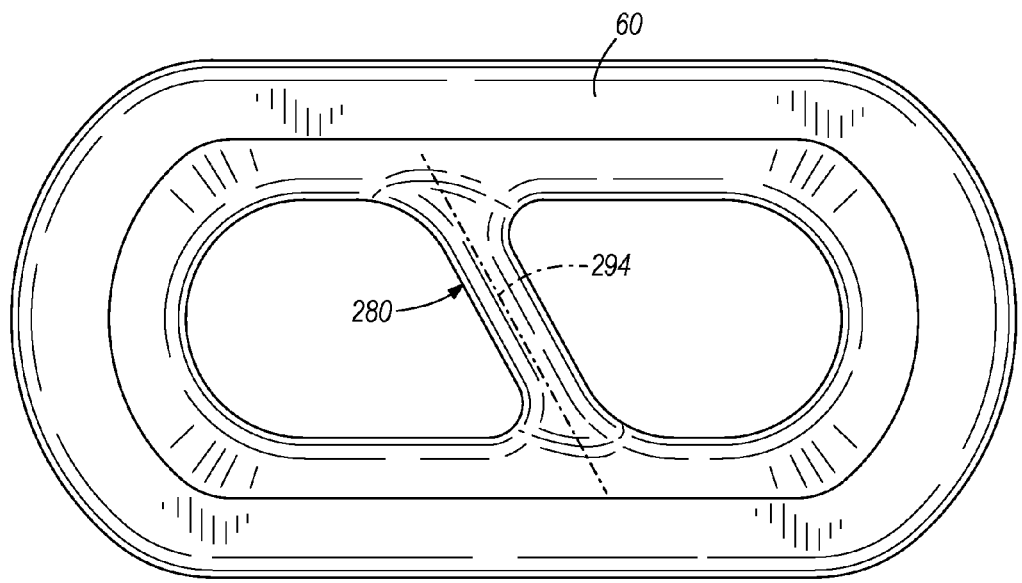
FIG. 8 is a side view of an alternate embodiment of the chain link according to this disclosure.

In other less preferred embodiments, as illustrated in FIG. 8, the point of attachment of the dividing element 280 is not at the midpoint of the shank 60, and the dividing element centerline 294 extends from one shank to the other shank at other than a 90-degree angle to the respective shanks.

The key to allowing the chain link of the "figure of eight type construction" to elastically flex under load is to move away from using a straight dividing element that sits centrally and perpendicular to the shanks of the chain link, to one which can bend. With this in mind, there are many variations of cross beam or dividing element that work.

The chain links of this disclosure reduce the overall weight of each chain link, thereby reducing the amount of power to move this chain in a chain conveying application. And the link is stronger when cross-loaded or abnormal loading occurs in the chain conveying application.

Accordingly, while only one embodiment of the present disclosure has been shown and described, it is obvious that many changes and modifications may be made thereunto without departing from the spirit and scope of the disclosure.

Various other features of this disclosure are set forth in the following claims.

The invention claimed is:

1. A chain link comprising:
   two shank portions;
   two arc portions connecting the two shank portions, wherein the two shank portions and the two arc portions define an interior space of the chain link; and
   a dividing element extending inwardly from an inside surface of one of the two shank portions and extending inwardly from the inside surface of the other shank portion,
   wherein said dividing element divides the interior space into two movement spaces,
   wherein the dividing element extends along a curved centerline from one shank to the other shank,
   wherein the curved centerline forms an S shape, and
   wherein a dividing element point of attachment to each shank portion has a larger cross sectional area than a cross sectional area of a midpoint of the dividing element.

2. A link chain comprising a plurality of individual chain links arranged in a repeating sequence, the sequence comprising:
   a first chain link comprising the chain link of claim 1; and
   a second chain link linked to the first chain link and movable within one of the two movement spaces of the first chain link.

3. A chain link comprising:
   a first shank portion and a second shank portion, the first and second shank portions extending generally in a longitudinal direction of the chain link;
   two arc portions connecting the first and second shank portions, wherein the first and second shank portions and the two arc portions define an interior space of the chain link; and
   at least one dividing element extending inwardly from an inside surface of the first shank portion and extending inwardly from an inside surface of the second shank portion,
   wherein the dividing element divides said interior space into two movement spaces,
   wherein the dividing element extends from the first shank at a first location and extends from the second shank at a second location that is offset in the longitudinal direction from the first location, and
   wherein a cross sectional area of the dividing element adjacent the first and second locations is larger than the cross sectional area of the dividing element at a midpoint of the dividing element.

4. A chain link in accordance with claim 3, wherein the first location is not at a midpoint of the first shank portion.

5. A chain link in accordance with claim 3, wherein the first location is between a midpoint of the first shank portion and a first of the arc portions, and wherein the second location is between a midpoint of the second shank portion and a second of the arc portions.

6. A chain link in accordance with claim 3, wherein wherein the dividing element is substantially straight.

7. A chain link in accordance with claim 3, wherein the dividing element is curved.

8. A chain link in accordance with claim 7, wherein the dividing element is substantially S-shaped.

9. A link chain comprising a plurality of individual chain links arranged in a repeating sequence, the sequence comprising:
a first chain link comprising the chain link of claim 3; and
a second chain link linked to the first chain link and movable within one of the two movement spaces of the first chain link.

10. A chain link comprising:
a first shank portion and a second shank portion, the first and second shank portions extending generally in a longitudinal direction of the chain link;
two arc portions connecting the first and second shank portions, wherein the first and second shank portions and the two arc portions define an interior space of the chain link; and
at least one dividing element extending inwardly from an inside surface of the first shank portion and extending inwardly from an inside surface of the second shank portion,
wherein the dividing element divides the interior space into two movement spaces,
wherein the dividing element extends from the first shank at a first location and extends from the second shank at a second location that is offset in the longitudinal direction from the first location, and
wherein the chain link includes means for reducing the stiffness of the dividing element.

11. A link chain comprising a plurality of individual chain links arranged in a repeating sequence, the sequence comprising:
a first chain link comprising the chain link of claim 10; and
a second chain link linked to the first chain link and movable within one of the two movement spaces of the first chain link.

12. A chain link comprising:
a first shank portion and a second shank portion, the first and second shank portions extending generally in a longitudinal direction of the first chain link;
two arc portions connecting the first and second shank portions, wherein the first and second shank portions and the two arc portions define an interior space of the first chain link; and
at least one dividing element extending inwardly from an inside surface of the first shank portion and extending inwardly from an inside surface of the second shank portion,
wherein the dividing element divides the interior space into two movement spaces,
wherein the dividing element extends from the first shank at a first location and extends from the second shank at a second location that is offset in the longitudinal direction from the first location, and
wherein a cross sectional area of the first shank portion adjacent the first location is reduced relative to the cross sectional area of the first shank portion adjacent the arc portions.

13. A link chain comprising a plurality of individual chain links arranged in a repeating sequence, the sequence comprising:
a first chain link comprising the chain link of claim 12; and
a second chain link linked to the first chain link and movable within one of the two movement spaces of the first chain link.

14. A chain link comprising:
two shank portions;
two arc portions connecting the two shank portions, wherein the two shank portions and the two arc portions define an interior space of the first chain link; and
a substantially straight dividing element extending inwardly from an inside surface of one of the two shank portions and extending inwardly from the inside surface of the other shank portion,
wherein the dividing element divides the interior space into two movement spaces,
wherein the dividing element extends from one shank to the other shank at other than a 90 degree angle to the respective shanks, and
wherein a cross sectional area of the first shank portion proximate the dividing element is reduced relative to the cross sectional area of the first shank portion proximate the arc portions.

15. A link chain comprising a plurality of individual chain links arranged in a repeating sequence, the sequence comprising:
a first chain link comprising the chain link of claim 14; and
a second chain link linked to the first chain link and movable within one of the two movement spaces of the first chain link.

16. A chain link comprising:
two shank portions;
two arc portions connecting the two shank portions, wherein the two shank portions and the two arc portions define an interior space of the chain link; and
a dividing element extending inwardly from an inside surface of one of the two shank portions and extending inwardly from the inside surface of the other shank portion,
wherein the dividing element divides the interior space into two movement spaces,
wherein the dividing element extends along a curved centerline from one shank to the other shank,
wherein the curved centerline forms an S shape, and
wherein a cross sectional area of the one of the two shank portions proximate the dividing element is reduced relative to the cross sectional area of the one of the two shank portions proximate the arc portions.

17. A link chain comprising a plurality of individual chain links arranged in a repeating sequence, the sequence comprising:
a first chain link comprising the chain link of claim 16; and
a second chain link linked to the first chain link and movable within one of the two movement spaces of the first chain link.

18. A link chain comprising:
a first chain link having a longitudinal extent and including a first shank portion, a second shank portion, and two arc portions connecting the first and second shank portions, the two shank portions and two arc portions cooperating to define an interior space of the chain link, the first chain link further including a dividing element extending between the two shank portions and dividing the interior space into two movement spaces, the dividing element including a first end extending from the first shank portion and a second end extending from the second shank portion, the first and second ends being longitudinally offset from one another; and a second chain link linked to said first link and movable within one of the two movement spaces of the first chain link, wherein a cross sectional area of the first end and a cross sectional area of the second end are larger than a cross sectional area of a midpoint of the dividing element.

19. A link chain in accordance with claim 18, wherein the first end is longitudinally offset from a midpoint of the first shank portion.

20. A link chain in accordance with claim 18, wherein the first end is between a midpoint of the first shank portion and a first of the arc portions, and wherein the second end is between a midpoint of the second shank portion and a second of the arc portions.

21. A link chain in accordance with claim 18, wherein the dividing element is substantially straight.

22. A link chain in accordance with claim 18, wherein the dividing element is curved.

23. A link chain in accordance with claim 22, wherein the dividing element is substantially S-shaped.

24. A link chain comprising:

a first chain link having a longitudinal extent and including a first shank portion, a second shank portion, and two arc portions connecting the first and second shank portions, the two shank portions and two arc portions cooperating to define an interior space of the chain link, the first chain link further including a dividing element extending between the two shank portions and dividing the interior space into two movement spaces, the dividing element including a first end extending from the first shank portion and a second end extending from the second shank portion, the first and second ends being longitudinally offset from one another; and a second chain link linked to said first link and movable within one of the two movement spaces of the first chain link, wherein the first chain link includes means for reducing the stiffness of the dividing element.

25. A link chain comprising:

a first chain link having a longitudinal extent and including a first shank portion, a second shank portion, and two arc portions connecting the first and second shank portions, the two shank portions and two arc portions cooperating to define an interior space of the chain link, the first chain link further including a dividing element extending between the two shank portions and dividing the interior space into two movement spaces, the dividing element including a first end extending from the first shank portion and a second end extending from the second shank portion, the first and second ends being longitudinally offset from one another; and a second chain link linked to said first link and movable within one of the two movement s paces of the first chain link, wherein a cross sectional area of the first shank portion adjacent the first end is reduced relative to the cross sectional area of the first shank portion adjacent the arc portions.

* * * * *